(12) United States Patent
Horrocks et al.

(10) Patent No.: US 11,632,627 B2
(45) Date of Patent: *Apr. 18, 2023

(54) SYSTEMS AND METHODS FOR DISTINGUISHING AUDIO USING POSITIONAL INFORMATION

(71) Applicant: INCONTACT, INC., Salt Lake City, UT (US)

(72) Inventors: Adam Samuel Horrocks, Sandy, UT (US); Matthew Lawrence Page, Sandy, UT (US); Nathan Edwin Boden, Riverton, UT (US); Christopher Garn Seaman, South Jordan, UT (US)

(73) Assignee: INCONTACT, INC., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/350,105

(22) Filed: Jun. 17, 2021

(65) Prior Publication Data

US 2021/0314704 A1 Oct. 7, 2021

Related U.S. Application Data

(63) Continuation of application No. 16/173,367, filed on Oct. 29, 2018, now Pat. No. 11,070,916.

(51) Int. Cl.
*H04R 3/12* (2006.01)
*H04R 5/033* (2006.01)
(Continued)

(52) U.S. Cl.
CPC ............... *H04R 3/12* (2013.01); *G06F 3/165* (2013.01); *H04R 5/033* (2013.01); *H04R 5/04* (2013.01)

(58) Field of Classification Search
CPC .. H04R 3/12; H04R 5/033; H04R 5/04; G06F 3/165
See application file for complete search history.

(56) References Cited

U.S. PATENT DOCUMENTS

2011/0058662 A1 3/2011 Yoakum
2015/0296086 A1 10/2015 Eckert

OTHER PUBLICATIONS

"HRTF (Head Related Transfer Function)," http://www.tech-faq.com/hrtf.html, pp. 1-2, printed Sep. 13, 2018.

(Continued)

*Primary Examiner* — David L Ton
(74) *Attorney, Agent, or Firm* — Pearl Cohen Zedek Latzer Baratz LLP (57) ABSTRACT

A separate virtual (e.g. aural) location for one or more interaction or telephony call participants may provide an indication or clue for at least one of the call participants of who is speaking at any one time, reducing errors and misunderstandings during the call. Auditory localization may be used so that participants are heard from separate virtual locations. An audible user interface (AUI) may be produced such that audio presented to the listening user is location-specific, the location being relevant to the user, just as information presented in a graphical user interface (GUI) might be relevant. For example, a plurality of audio streams which are part of an interaction between communicating parties may be accepted, and based on the audio streams, a plurality of audio outputs may be provided, each located at a different location in three-dimensional space.

14 Claims, 4 Drawing Sheets

(51) Int. Cl.
*H04R 5/04* (2006.01)
*G06F 3/16* (2006.01)

(56) References Cited

OTHER PUBLICATIONS

"Web Audio API," printed Sep. 13, 2018, pp. 1-31, http://www.w3.org/2011/audio/drafts/1WD/WebAudio/, Rogers, Chris, ed.

SYSTEMS AND METHODS FOR DISTINGUISHING AUDIO USING POSITIONAL INFORMATION

CROSS-REFERENCE TO RELATED APPLICATIONS

This application is a continuation of U.S. patent application Ser. No. 16/173,367, filed Oct. 29, 2018, which is hereby incorporated by reference in its entirety.

FIELD OF THE INVENTION

The invention relates generally to telephone technology and computer interface technology, and in particular, using artificially created position information to aid a listener in determining active call participants or active computer applications.

BACKGROUND OF THE INVENTION

In modern call centers, human agents engage in telephone, voice, chat, e-mail and other communications with people who are, for example, customers. Technology exists that tracks, routes, takes in and emits the multiple communications channels that each agent may handle simultaneously. This existing technology may handle multiple communications channels for many agents at the same time, and in addition coordinating (e.g., input, process, and present) information regarding various parties involved in the communications channels. Contact center agents are required to be effective multi-taskers. Agents can experience information overload during a call, especially when other participants join, as a technician, supervisor, or shipping clerk, in a conference call or other type of call. Agents may handle multiple contacts at once, multiple parties may be conferenced into a single call, participants not heard by all participants may speak to the agent (e.g. a supervisor may speak to the agent via the call without the customer hearing), and multiple monitors or screens showing applications may provide data or input, such as e-mail, customer support, database, etc., with contact- or call-related information.

There is a need for agents or other call participants in a conference call to identify other callers or speakers, e.g. the currently active or speaking party. Such capability is not available using conventional telephone and call center technology. There is also a need to provide contextual information to the agent without requiring a view of the user interface or displayed applications seen by the agent.

SUMMARY OF THE INVENTION

In an embodiment of the invention, conventional call center technology or telephony technology is improved by creating a separate virtual (e.g. aural) location for each guest or call participant, which may provide an indication or clue for at least one of the call participants (e.g., the agent) of who is speaking at any one time, reducing errors and misunderstandings during the call. Call participants such as agents may better understand and/or identify a particular call participant when auditory localization is used, and participants are heard from separate virtual locations. A system and method may provide audio output. A plurality of audio streams which are part of an interaction between communicating parties may be accepted. Based on the audio streams, a plurality of audio outputs may be provided, each located at a different location in three-dimensional space. The locations of the audio outputs may be in "virtual" three-dimensional space as perceived by a listener. In one application, conventional call center technology or telephony technology is improved by creating a separate virtual (e.g. aural) location for each guest or call participant, which may provide an indication or clue for at least one of the call participants (e.g., the agent) of who is speaking at any one time, reducing errors and misunderstandings during the call.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

An embodiment of the present invention accepts audio streams which may be part of one or more interactions between communicating parties, provides to at least one person (typically a participant in the interaction) a plurality of is audio outputs, each typically one of the audio streams, each output located (or perceived to the party to be located) at a different location in three-dimensional space. An audible user interface (AUI) may be provided, such that audio presented to the listening user is location-specific, and that location is relevant to the user, just as information presented in a graphical user interface (GUI) might be relevant. The virtual locations of the participants may be configured by the user, just as screen locations may be configured for a GUI. The AUI may interact with or correspond to elements in a GUI displayed to a user.

Figure 1:
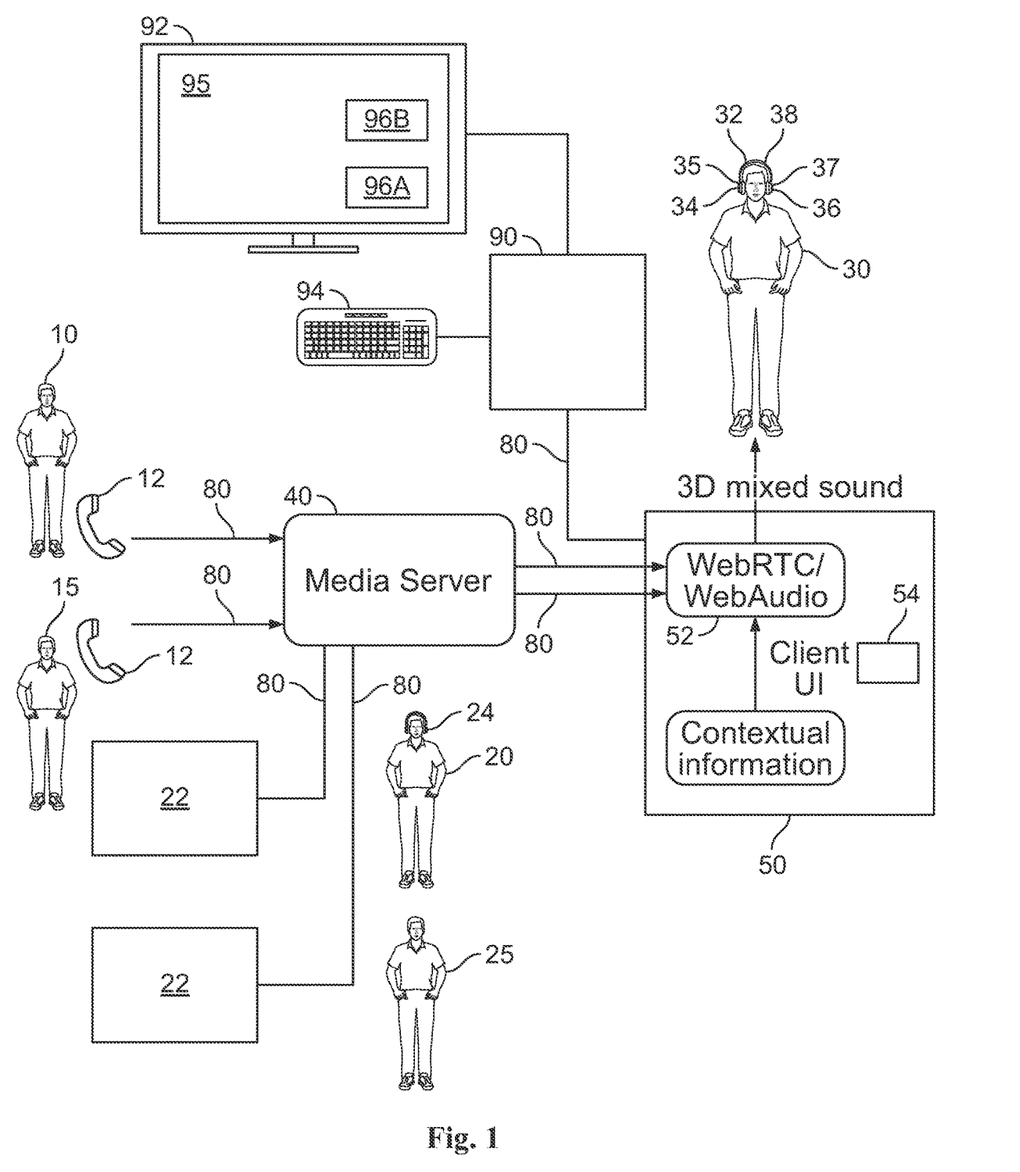
FIG. 1 is a block diagram of a system for providing context or other information to a listener, according to an embodiment of the present invention.

FIG. 1 is a block diagram of a system for providing context or other information to a listener, according to an embodiment of the present invention. Multiple callers or call participants such as participants 10, 15, 20, 25 and 30 may participate or communicate via one or more interactions comprising audio. For example participants may engage in a multi-party or conference telephone call (typically an audio call) using telephone devices 12 or computing devices 22, possibly using headset(s) or headphones 24 and 32. Typically at least one communicating party, caller or call participant 30 uses headphones or headset 24 or 32, which typically is a set of headphones, in order to provide three-dimensional position experience. In one example embodiment participant 10 is a caller or customer calling a contact center; participant 30 is an agent providing service or advice to a customer; and participant 20 is a supervisor providing advice or training to participant 30. Participants 15 and 25 may also participate. Of course, other numbers of participants and other combinations of participants may participate in an interaction; further, three-dimensional sound may be provided to more than one participant.

Telephone devices 12 may be for example conventional telephones, cellular telephones, telecommunications devices, telephony modules or software which are part of computers, personal computers, smart or dumb terminals, etc. Computing devices 22 and 90 may be for example personal computers, smart or dumb terminals, laptop computers, etc. Typically computing devices 22 and 90 include equipment enabling communications which can be part of interactions, such as voice communications, video communications, text or chat communications, e-mail communications, etc. Since telephone devices 12 may be smartphones, such devices may also include capabilities for communications such as voice, video, text or chat, e-mail communications, etc. Telephone devices 12 and computing devices 22 and 90 are shown differently as an example only; each participant may use the same or different type of device. Different voices, voice streams, sound effects, or other sounds presented to a certain call participant may appear, to the participant, to be located above, to the left, in front of, in back of, etc. the call participant. The various entities shown may communicate by one or more networks 80, such as external telephony and cellular networks, or the Internet, or other networks external to an organization, or internal networks within an organization.

Call participant 30 may be an agent at a call center, but need not be: while example equipment described herein is equipment related to a call center, embodiments of the invention can be used by different entities, and call participant 30 need not be an "agent". Call participant 30 may be associated with and use an agent computer or terminal 90, which may be for example a computer, workstation, terminal etc. and which may include computer screen(s), computer displays, screens or monitors 92, input device(s) 94 including for example a keyboard, mouse, touchscreen, microphone, etc. Agent terminal 90, computers or terminals 22, telephones 12, and other devices and modules in FIG. 1 may include or have their functionality executed by components similar to those shown in FIG. 2 or other components. Monitor(s) 92 may display user interface 95 (e.g. information, applications, input areas, depictions of call participants possibly including position information, etc.), including one or more applications such as applications 96A and 96B (e.g. e-mail applications, chat or instant messaging (IM) applications, customer database applications, quality control applications, call center customer information applications, etc.). User interface 95 may be displayed across multiple monitors 92. Applications 96A and 96B may be communications-related applications but may also be other applications such as word-processing, database, order processing, customer information, spreadsheet, billing or account management, quality control, or other applications.

Media server 40 may collect or accept a number of incoming audio streams or segments of calls and provide call control elements of the various voice legs of call, for example passing through audio streams without mixing. Each incoming audio stream may be from, for example, a different person in a multi-party communication session. Media server 40 may act as a call control for calls in external telephony networks (such as Session Initiation Protocol (SIP) signaled telephony networks), as well as connection points to the external call legs for audio streams to and from client user interface (UI) module 50.

Agent terminal 90 may receive individual call streams or audio streams, each corresponding to a call participant, as opposed to a mix of the streams as one stream, and may output the streams to the user of terminal 90 as positional audio, but in other embodiments positional audio may be produced external to agent terminal 90. For example, client UI module 50 may be, or be executed in, for example a web browser executed on agent terminal 90. While shown external to agent terminal 90, UI module 50 may be part of agent terminal 90, or in other embodiments may be external to agent terminal 90. Client UI module 50 may provide components or all of agent user interface 95 on monitor or screen 92 with which the agent interacts. WebRTC (real-time communications) module 52 may be part of client UI module 50 and may provide audio streaming of one or more connected bidirectional audio streams. Audio may be streamed to and/or from the media server 40, which in turn may connect to external telephony call legs or other audio streams.

Audio module (e.g. WebAudio) 54 may be part of client UI module 50 and may produce and provide positional audio, for example using the Web Audio API (application programming interface) of HTML 5 standard, which processes incoming audio sources to introduce effects which induce the listener, in this example call participant 30, to perceive positional location for each connected audio stream. The Web Audio API may be a high-level JavaScript API that can be used for processing and synthesizing audio in web applications. Audio processing in the Web Audio API may be handled by execution of code within a web browser, but the API may allow control via JavaScript. Other technologies or products may be used in audio module 54 to produce positional audio data. For example, a head-related transfer function (HRTF), or anatomical transfer function (ATF), which characterizes how an ear receives a sound from a point in space, may be used to synthesize a binaural sound that seems to come from a particular point in space.

Three-dimensional sound may be created (e.g. by audio module 54 or another module) for example by taking advantage of methods the human brain uses to perceive and place sounds in real life: e.g. the difference in time it takes for a sound to reach your left and right ears, volume differences between our ears, and the changes in a sound's frequency between our ears. Variances in how our right and left ears hear a sound allow people to determine things like distance, height, and where a sound is originating from.

Headset or headphones 32 may include for example a pair of earphones, loudspeaker drivers or speakers 34 and 36 each surrounded by "cans" or earcups (which also may be called headphones, and which may be soft despite being called cans) 35 and 37 worn on or around the head over a user's ears, connected by a band 38 to hold the speakers 34 and 36 and cans 35 and 37 in place against the users ears. Typically earbuds or devices inserted into a user's ears or ear canal, are not used. Cans 35 and 37 may surround or be placed over the user's ears, and typically each can 35 and 37 and associated speaker or driver 34 and 36 is designated as left or right.

While "telephone" is used to describe the calls, the calls involved can be computer based, computer voice-over-IP (VOIP), or other telephone or audio call technologies. Further, the calls may include technologies beyond audio, e.g. video or screen sharing. More than or less than three participants may be involved, and equipment used may be other than depicted: for example speakerphones, cellular telephones, computer VOIP equipment using for example microphones and speakers, etc. Interactions may be for example voice interactions such as voice telephone calls or other calls, including multi-party calls or conference calls; video interactions such as two-way or multi-way video calls or videoconferencing.

Different voices, voice streams, sound effects, or other sounds presented to a certain call participant may seem, to the participant, to be located above, to the left, in front of, in back of, etc. the call participant. Such positional information may mimic what a real discussion between multiple parties present in the same room sounds like, but also may be removed from any reality of position in a conversation, and may provide identity information, may provide role information, such as who is a supervisor and who is a customer, and may provide other information. While prior art stereo presentation of telephone calls exists, which may play certain audio in the left ear and certain audio in the right ear, this does not provide the illusion of three-dimensional positioning, and this positioning is not linked to other information as in embodiments of the present invention.

For example, based on the interaction or audio streams, a system may generate or provide a plurality of audio outputs to one or more call participants (for example to call participant 30), each stream or output seeming to the listener to be located at a different location in three-dimensional space, typically within the listener's immediate surroundings. Other participants need not use headphones if a three-dimensional experience is not to be provided to those participants.

Based on the interaction or audio streams a user may be provided with dual-channel audio that simulates a three-dimensional position for each interaction or each of the audio streams, where some audio streams may or may not overlap in or have the same simulated or perceived position, but at least one has a position different from the others. A distinct virtual position in three-dimensional space may be assigned or may be accepted for each audio stream in a call or communication session. While as discussed herein a different virtual position may be used for each participant, if one stream of a conference call is generated by a speakerphone shared by multiple participants, a virtual position typically cannot be established separately for these participants, and all these particular participants may be assigned one virtual position.

In one embodiment this simulated audio may be generated or produced by client UI module 50, but functions discussed herein may be performed by other modules or units. Simulated audio may be generated by taking as input the audio streams and processing them to create left and right channels or audio streams and outputting a left portion of the resulting left-right channel audio stream to a left earcup 35 or driver 34 and outputting a right portion to a right earcup 37 or driver 36, so that when the left-right stream is heard by a listener, audio or an audio stream related to each audio stream is perceived by the user listening to headphones 32 to be at a location in three-dimensional space surrounding the user. Multiple audio streams may be at the same or substantially the same location (e.g. a group of parties designated as belonging to a certain category); however, typically, for at least one audio stream, and possibly more than one, audio related to that audio stream is perceived at a different location in three-dimensional space from the perceived location of other audio streams. The three-dimensional space may be defined relative to the listener, for example by a left-right axis, an up-down axis, and a forward-backward axis, but may be defined as locations near the listener.

Three-dimensional simulated sound may allow output via headphones 32 such that the hearer can determine the direction and distance of a sound relative to his/her head position. For example, the voice of a call participant may be localized such that she seems to be speaking to the listener from about 10 feet away and off to his front-left. This is known as "sound localization" and uses sophisticated acoustic processing techniques.

In one embodiment, conferencing may allow one or more parties (e.g. participants 10, 15, 20, 25 and 32) to take advantage of sound localization. Each party or one or more parties in a conference call may automatically be assigned a fixed "sound locale" in the conference call. For example, each party may perceive the other parties as being in a semicircle in from of them; further, in one embodiment each party may appear to be in the same position in each listener's perception of the call. Alternately, party location may correlate with or indicate the geography of the party, or be manually configured by the parties. Each participant in the conference call may hear the other participants from what seem to be fixed locales which are close to the participant but vary in direction. In the case that there are primary and secondary attendees to a conference call, the secondary attendees may be localized at a farther distance than primary attendees. Typically, a listener is most comfortable when the locales assigned for the others in the conference are perceived as being in front of him or her, but in some embodiments voices may be perceived to be above, behind, etc. the listener.

Typically conference call participants are most comfortable when the locales assigned for the others in the conference call are perceived as being in front of him or her, rather than the disquieting feeling of someone suddenly speaking from behind them. However, location may be made according to different embodiments and their requirements, service configuration, moderator configuration, attendee configuration, etc., and perceived or simulated locations may be above, behind, or below.

In one embodiment, data regarding the audio streams or interactions may be displayed in one or more monitor(s) 92 and user interface 95 (including possibly in application(s) 96A and 96B). Production of and control of user interface 95 and other data on monitor(s) 92 may be by UI module 50. Data regarding the audio streams or interactions may include a location in three-dimensional space for audio related to each audio stream, which may be correlated to or correspond to information for the audio stream displayed on monitor(s)

92 and user interface 95. For example, monitor(s) 92 or user interface 95 may provide an indication of each person on the call; or a position for each interaction, audio stream or person, which may correspond to the virtual position in three-dimensional space for the interaction, audio stream or person.

In one embodiment, a positional map may be displayed on a user interface such as interface 95 showing a position of call participants, typically on a two-dimensional space (as monitor(s) 92 are typically two-dimensional), and may show information for the audio stream such as which participant is where (e.g. which participant is simulated as being where). A user or agent may configure where certain sounds or audio streams will appear to be heard, or may configure which sounds are placed in three-dimensional space. For example, an agent may input, for example using interface 95, where certain people will be perceived to be heard, if certain applications make sounds on certain events, and where those sounds appear to come from.

Figure 3:
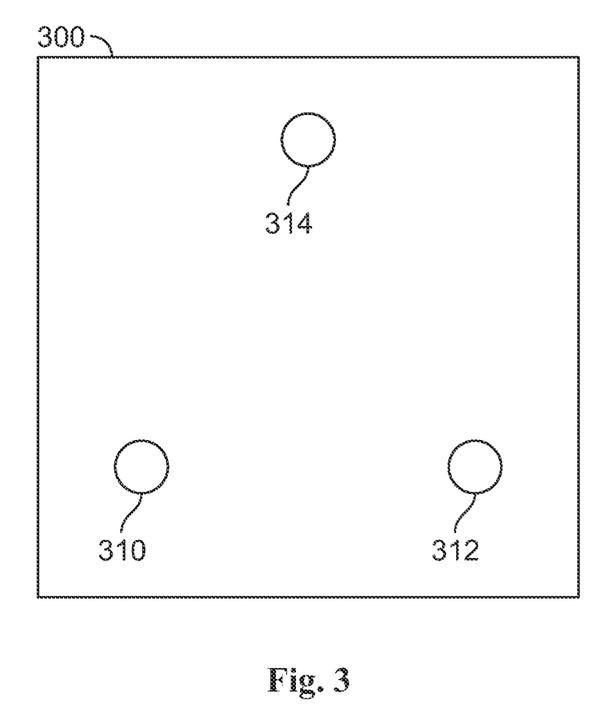
FIG. 3 depicts an example screen display showing positional information for call participants according to one embodiment.

FIG. 3 depicts an example screen display showing positional information for call participants corresponding to, related to, or correlated to three-dimensional audio positional information perceived by a caller. In FIG. 3, key, map or location application 300 may be an application or graphical display displayed for example on or as part of interface 95, and may include representations, avatars or symbols 310, 312 and 314, indicating, representing or corresponding to the simulated three-dimensional audio position of call participants associated with the avatars or symbols 310, 312 and 314.

Since, typically, a screen display is two-dimensional, and simulated audio positional information is three-dimensional, a screen display such map 300 as may indicate, correspond or correlate to only part (e.g. a two-dimensional version of) of the positional information perceived in three-dimensional audio. Thus if the audio three-dimensional space perceived by listener 30 is defined relative to listener 30 by a left-right axis, an up-down axis, and a forward-backward axis, the screen map 300 may only show two of those axes, or may compress two of the three dimensions into one on-screen axis. Other on-screen displays may be shown, for example representing three dimensions on a two-dimensional display using known methods.

Thus depending on the embodiment, map 300 may show or indicate to a viewer that call participant 10 corresponding to representation 310 is to the left (when perceived using three-dimensional audio) of the listener (e.g. call participant 30), who is also the viewer; call participant 15 corresponding to representation 312 is "heard" to the right of the listener, and participant 20 (a supervisor providing advice) corresponding to representation 314 is heard above listener 30. Thus the position of representations of call participants corresponds to the perceived audio positions of those call participants.

Call participants may be represented or differentiated as avatars, photographs of the caller, by colorization, by alphanumeric text, or by symbols identified by, for example, name, caller ID (e.g. telephone number), chat ID, e-mail address, etc. Thus representations 310, 312 and 314 may be labelled, colorized, etc. The position in two-dimensional space of representations correlating or corresponding to each participant on a monitor 92 may correspond to the perceived position of the audio stream corresponding to the caller in three-dimensional space. An agent may move (e.g., using an input device such as a mouse or touchscreen) avatars or representations 310, 312 and 314, user interface 95 may accept the input, and UI module 50 may move the audio stream corresponding to the moved avatar in 3D space. E.g. if representation 310 is moved by the user or placed by the user to the right side of map 300, the audio corresponding to the caller represented by 310 may move or be placed in three-dimensional space to the right, or be placed in a position to the right. In some embodiments, an avatar, text or symbol representing a speaker or caller may brighten, change color or otherwise change its visual representation when that person is speaking. Caller avatars or symbols can include information such as a caller's position within an organization (e.g. supervisor, trainer etc.) and a caller's department (e.g. billing, shipping, etc.).

In some embodiments, for example scenarios where three or more parties converse in a call, more than one party (e.g. the call center agent and also the supervisor or coach) may use dual-channel calls, where three-dimensional information is provided. In a call center environment, agents may think of the supervisor as being located nearby and the caller (e.g. a customer) as being located far away. If the agent is being coached, a system may arrange the audio so that the caller does not hear the supervisor but the agent does. However, in a "barge-in", the caller may hear both agent and coach as a single mixed channel, and in a "take-over" the supervisor may take the place of the agent and converse with the caller or customer. A call participant not familiar with the significance or meaning of positional audio, may hear single-channel audio, so as to not be confused.

In one embodiment, three-dimensional audio information regarding applications or programs may be provided to a user or added to the audio provided via a system such as shown in FIG. 1. Such an embodiment may correlate the positional "soundstage" of the agent's headphones with the physical position of the applications on screens. For example, applications 96A and 96B may be displayed on monitor(s) 92, and may provide notifications, such as alerts, or other information, to a user. Such notifications, or information regarding such notifications, may be provided to the user via three-dimensional audio. In one embodiment, each application may have an on-screen position, and a left-right channel audio stream may be provided to the user or added to an audio stream including an audio prompt (e.g. a tone or a sound effect) corresponding to one application such that the audio prompt is perceived when heard by the user to be at a location in three-dimensional space distinct from or different from the location of another audio prompt corresponding to a different application.

For example, application 96A (FIG. 1) which may be, for example, an e-mail application, may alert a user when a new e-mail is arrived; and application 96B, for example a word processing application, may alert a user if attention to a prompt is needed. These alerts may include or be audible tones, sounds, etc. Such tones may be louder or change with urgency; for example an e-mail which has not been responded to for a certain amount of time may result in a louder tone or different position than the e-mail generated previously in time, or the priority of an incoming message may affect the tone or the tone's volume or position. A tone may be produced which appears to the listener in three-dimensional space to correspond to the relative position of the application (relative to other applications, or relative to other on-screen objects). For example, since application 96A is displayed below application 96B in FIG. 1, if application 96A demands a user attention (e.g. application 96A receives an e-mail and wants to notify a user) a tone may be generated in three dimensional space below the place in three dimensional space that a tone corresponding to or correlated with application 96B may appear. Multiple monitors 92 may be used, and if so the relative position of applications may include or factor in the relative positions of monitors 92, which affect the positions of applications displayed on monitors 92. A user may move applications on-screen, and the position of the alert tones may be adjusted accordingly.

In some embodiments, improvements to conference call or call-center technology can result from conveying information beyond merely who is talking or which call participant is active, or conveying which application is active or seeking attention: in some embodiments, a certain position in three-dimensional space may be assigned for a person having a certain role or organizational position. For example, participants in a conference call may be assigned positions generally at head level, along a horizontal plane, but a supervisor may appear to speak from above, over a user's right shoulder, or in some position outside of the range of conventional call participants. In some embodiments, a supervisor or trainer may be heard by only one call participant, such as the user or call agent wearing headphones who is being trained or coached by the supervisor, and may not be heard by other participants (e.g. customers). This may prevent a response by an agent to a supervisor comment confusing other callers. In another example implementation, a person from a certain department, e.g. billing, may always appear to be speaking from one position, e.g. to the right.

Standardization of positions corresponding to call roles may allow for automatic perception and easy remembering of an agent of the role of each caller or person speaking as they speak. This may be important in a context where certain parties to the call must be acknowledged or responded to (such as the customer calling in), while some parties (such as a coaching supervisor) should not be acknowledged or responded to audibly. Misidentification to a party (e.g. an agent speaking to a coach, and the customer hearing) is not desirable. For example, if the supervisor's virtual location is always just behind the left ear of the agent, the agent will soon reflexively recognize the coaching of a supervisor, regardless of supervisor gender or vocal characteristic, whenever the agent hears a voice from behind and to the left. Similarly, if the original contact for a communication session (e.g. the inbound caller or outbound called party) is always in a virtual position directly ahead of the agent, the agent will instantly know how to interpret what she or he is hearing in the overall context of the conference. Additional roles may be assigned for other positions. Standard roles may be further reinforced by a standardized colorization scheme for a displayed avatar of each standard role (e.g., an embodiment of the example shown in FIG. 3).

Simulated audio position may have other meanings. In some embodiments, if an agent is switching between multiple different interactions or calls (where, except for the agent, the participants of the different interactions cannot hear each other), audio from each of the interactions may be positioned in a different point in three-dimensional place as the other(s). In some embodiments, the actual location of the user in the world may be reflected in corresponding positional information. For example, for a set of callers calling from locations in North America, someone calling from the West Coast may appear to be to the left of the listener, and someone calling from the East Coast may appear to be to the right of the listener. The priority of the caller may be reflected in different positions of corresponding audio in three-dimensional space.

Much of the information a call center agent receives is visual, via computer monitors. By presenting some of this information (e.g. who is speaking) via auditory sensory perception, information may be conveyed to an agent while the agent is scanning other information. This may make the agent more effective in interactions with others on the call, with fewer misunderstandings during the course of the call, by instinctively correlating speaker location with speaker identity.

Figure 2:
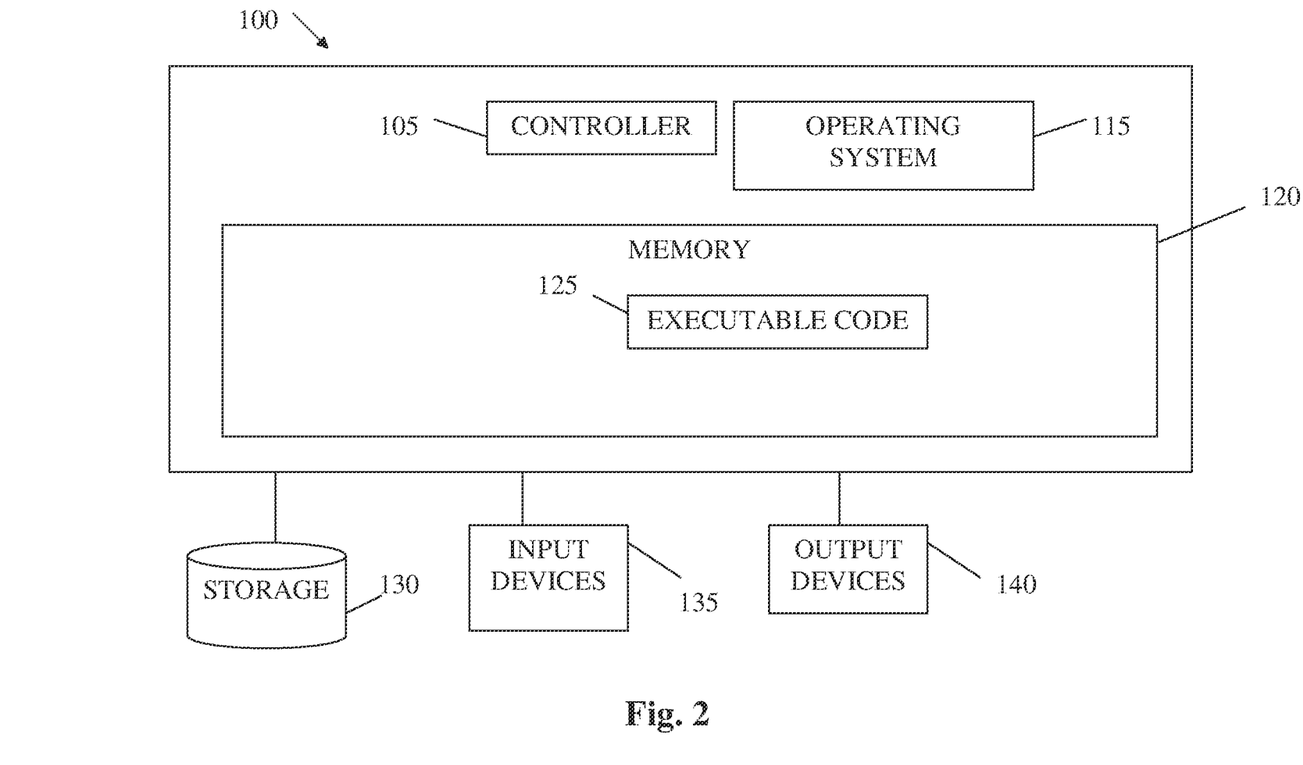
FIG. 2 shows a high-level block diagram of an example computing device which may be used with embodiments of the present invention.

FIG. 2 shows a high level block diagram of exemplary computing devices which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140. Each of modules and equipment such as telephone devices 12, computing devices or terminals 22, media server 40, WebRTC module 52, client UI module 50, audio module 54, etc. may be or include a computing device, such as shown in FIG. 2, although various units among these entities may be combined into more than one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units.

Executable code 125 may be any executable code, e.g., an application, a program, a process, task or script. Executable code 125 may be executed by controller 105 possibly under control of operating system 115. For example, executable code 125 may be an application which produces three-dimensional audio, coordinates audio with on-screen-displays, routes calls, etc., according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Call data or other data may be stored in a storage 130 and may be loaded from storage 130 into a memory 120 where it may be processed by controller 105. In some embodiments, some of the components shown in FIG. 2 may be omitted.

Input devices 135 may be or may include a microphone, telephone handset, mouse, a keyboard, a touch screen or pad or any suitable input device. It will be recognized that any suitable number of input devices may be operatively connected to computing device 100 as shown by block 135. Output devices 140 may include one or more displays, speakers, headphones and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable storage medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 4:
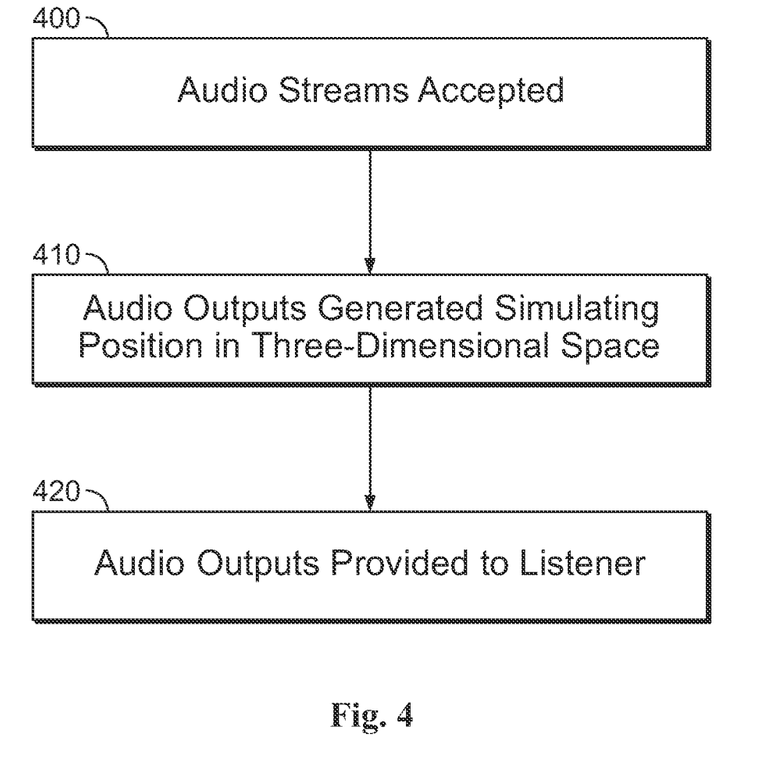
FIG. 4 is a flowchart of a method according to embodiments of the present invention.

FIG. 4 is a flowchart of a method according to embodiments of the present invention.

In operation 400, a number of audio streams may be accepted. The audio streams may be for example part of an interactions between communicating parties, such as a conference call, video conference or another interaction. Typically each audio stream is from a different person, e.g. a different caller.

In operation 410 input may be processed and a number of audio outputs may be generated, for example one for each incoming or input audio stream accepted in in operation 400. The audio outputs may be for example included in or part of one two-channel audio stream which, for each of the incoming audio streams, simulates a position in three-dimensional space for the incoming audio stream. Each simulated output may be located at (e.g. perceived to be located at) a different location in three-dimensional space, although one or more outputs may be co-located at the same space. Different "virtual" positions, e.g. distinct positions, may be assigned for different audio streams, for example, based on pre-configured parameters, based on user configuration, based on the role of the person (e.g. a customer or incoming caller is assigned a different position from a supervisor or coach), and/or correlated to a position of a symbol for or an avatar for the person on an on-screen map. Typically, the audio stream provided by the listener or user to whom the output is eventually provided does not have his or her speech input to the audio stream: e.g. the speaker does not hear an echo of his/her voice. However, in some applications, "side tone" may be used, where microphone audio is fed into an earpiece.

In operation 420, the audio outputs may be provided to a listener or user. For example, a two-channel or left-right channel audio stream may be provided to a listener via headphones, such that the two-channel audio stream causes the user to perceive at least one of the audio streams received in operation 400 at a different location in three-dimensional space from one or more other audio streams. In some embodiments, a left portion of a left-right channel audio stream may be output to a first earcup of the headphones, a right portion may be output to a second headphone earcup Other or different operations may be used.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. A method of providing audio output, the method comprising:
    displaying to a user a plurality of computer applications, each application having an on-screen position; and
    providing to the user in a left-right channel audio stream an audio prompt corresponding to a first of the plurality of computer applications such that the audio prompt is perceived when heard by the user to be at a location in three-dimensional space distinct from the location of another audio prompt corresponding to a second of the plurality of computer applications.

2. The method of claim 1, wherein:
    providing the plurality of audio prompts comprises:
    outputting a left portion of a left-right channel audio prompt to a first earcup of a set of headphones, and outputting a right portion of a left-right channel audio prompt to a second earcup of the set of headphones.

3. The method of claim 1, wherein the three-dimensional space is defined relative to the user by a left-right axis, an up-down axis, and a forward-backward axis.

4. The method of claim 1, comprising:
    accepting a plurality of audio streams, each associated with an organizational role, which are part of an interaction between communicating parties; and
    based on the audio streams and the associated organizational roles, providing a plurality of audio outputs each associated with an audio stream, each output located at a different location in three-dimensional space, the location of each output determined, automatically, by a processor, by the organizational role associated with the audio stream associated with the output;

wherein an audio stream of the plurality of audio streams is a voice telephone call.

5. A method of providing audio output, the method comprising:

processing a plurality of audio streams to produce a left-right channel audio stream such that when the left-right channel audio stream is heard by a listener, a first audio stream of the plurality of audio streams is perceived to be at a location in three-dimensional space different from the perceived location of a second audio stream of the plurality of audio streams; and displaying to the listener a plurality of computer applications, each application having an on-screen position; and providing to the listener in a left-right channel audio stream an audio prompt corresponding to a first of the plurality of computer applications such that the audio prompt is perceived when heard by the listener to be at a location in three-dimensional space distinct from the location of another audio prompt corresponding to a second of the plurality of computer applications.

6. The method of claim 5, comprising providing on a computer display an indication of a position for each audio stream of the plurality of audio streams, the position on the computer display of each audio stream corresponding to the virtual position in three-dimensional space for the audio stream.

7. The method of claim 5, wherein the three-dimensional space is defined relative to a listener by a left-right axis, an up-down axis, and a forward-backward axis.

8. A system for providing audio output, the system comprising:

a memory; and a processor configured to:

display to a user a plurality of computer applications, each application having an on-screen position; and provide to the user in a left-right channel audio stream an audio prompt corresponding to a first of the plurality of computer applications such that the audio prompt is perceived when heard by the user to be at a location in three-dimensional space distinct from the location of another audio prompt corresponding to a second of the plurality of computer applications.

9. The system of claim 8, wherein:

providing the prompt comprises:

outputting a left portion of a left-right channel audio stream to a first earcup of a set of headphones, and outputting a right portion of a left-right channel audio stream to a second earcup of the set of headphones, so that audio related to the prompt is perceived to be at a location in three-dimensional space.

10. The system of claim 8, wherein the processor is to:

accept a plurality of audio streams, each associated with an organizational role, which are part of an interaction between communicating parties; and based on the audio streams and the associated organizational roles, provide a plurality of audio outputs, each associated with an audio stream, each output located at a different location in three-dimensional space, the location of each output determined automatically, by a processor, by the organizational role associated with the audio stream associated with the output; and wherein the location in three-dimensional space for audio related to each audio stream is correlated to information for the audio stream displayed on a computer display.

11. The system of claim 10, comprising providing on a computer display an indication of a position for each audio stream.

12. The system of claim 10, wherein an audio stream of the plurality of audio streams is a voice telephone call.

13. The system of claim 8, wherein the three-dimensional space is defined relative to a user by a left-right axis, an up-down axis, and a forward-backward axis.

14. A method of providing audio output, the method comprising:

displaying on a user interface a plurality of applications, each at an on-screen position; and providing in an audio stream a sound corresponding to a first of the plurality of computer applications such that the sound is perceived when heard by a user to be at a location in three-dimensional space distinct from the location of another sound corresponding to a second of the plurality of computer applications.

* * * * *